United States Patent [19]

Sanders

[11] 4,050,684
[45] Sept. 27, 1977

[54] VELOCITY SENSITIVE DUAL RATE SHOCK STRUT

[76] Inventor: Franklin C. Sanders, 13712 Prospect Ave., Santa Ana, Calif. 92705

[21] Appl. No.: 706,798

[22] Filed: July 19, 1976

[51] Int. Cl.² ............................................. F16F 9/48
[52] U.S. Cl. .................................. 267/65 R; 188/289; 188/314
[58] Field of Search ............... 188/289, 284, 314, 315, 188/269, 280, 281, 282, 285; 280/276, 714, 672; 267/8 A, 64 R, 64 A, 64 B, 65 R, 65 A, 136, 139, 129

[56] References Cited

U.S. PATENT DOCUMENTS

| 1,655,786 | 1/1928 | Guerritore | 188/289 |
|---|---|---|---|
| 3,787,019 | 1/1974 | Freitag | 188/314 X |
| 3,885,776 | 5/1975 | Blatt | 188/289 X |
| 3,888,436 | 6/1975 | Sealey | 188/314 X |

FOREIGN PATENT DOCUMENTS 1,455,951  2/1969  Germany ............................. 188/289

*Primary Examiner*—Trygve M. Blix
*Assistant Examiner*—Douglas C. Butler
*Attorney, Agent, or Firm*—George W. Finch

[57] ABSTRACT

A shock strut employing fluid as a damping medium and gas trapped in a primary chamber above the fluid as a spring is modified by adding a secondary chamber with an orificed inlet to the primary chamber above the normal fluid level. For low velocity deflections of the strut, the gas can pass freely through the orifice so that the effective volume into which the gas is compressed is enlarged thereby reducing the spring rate. For high velocity deflections, the orifice meters the passage of the gas to the secondary chamber so that a higher spring rate is momentarily present. On extreme deflections, the fluid level within the strut reaches the orifice which severely restricts flow therethrough to cause a second greatly increased spring rate for the gaseous spring which also is velocity sensitive.

16 Claims, 4 Drawing Figures

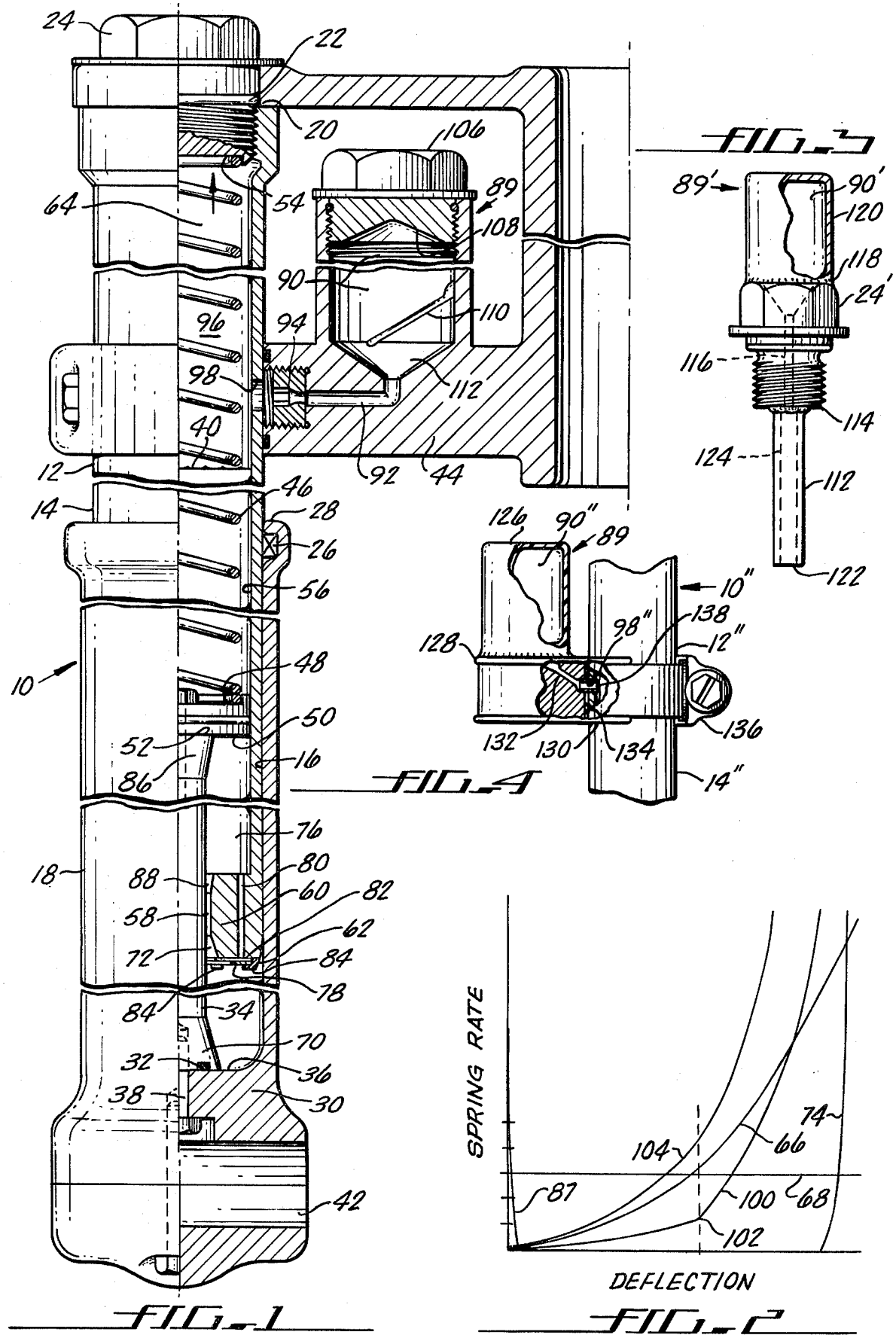

VELOCITY SENSITIVE DUAL RATE SHOCK STRUT

BACKGROUND OF THE INVENTION

Shock struts such as those commonly used to form the front forks of motorcycles each usually include a pair of telescoping cylinders with a mechanical spring connected between them either internally or externally to assure extension thereof when excessive forces are not being applied thereacross. Each strut also employs a quantity of fluid such as hydraulic fluid which is forced through narrow passageways within the strut to provide dampening when the two cylinders are moved with respect to each other. The upper surface of the fluid is used as a piston to compress gaseous medium which is usually air trapped in the upper portion of the top telescoping cylinder attached to the triple clamp of the motorcycle. This air spring of course has a variable spring rate that depends upon the deflection of the shock strut. In some instances the gaseous medium is pressurized and the mechanical spring is eliminated.

Unfortunately, because of the rough abuse to which motorcycles and their suspension are subjected, especially when such motorcycles are used in races across desolate areas or in the sport of moto-cross where the course is intentionally made hazardous and rough, the combined mechanical spring and/or air spring must be very stiff since otherwise hard bumps may completely compress them causing the strut to "bottom out" and transmit overloads into the motorcycle frame. This stiffness makes the motorcycle extremely uncomfortable to ride when on relatively smooth terrain since a stiff strut transmits much more vibration and shock to the motorcycle and the motorcyclist than a soft one. Therefore, if an enthusiast buys a motorcycle suitable for off the road racing, he must either buy two sets of shock struts and change them depending on the intended use to live with an extremely rough, jarring and uncomfortable ride when the motorcycle is being used on fairly smooth terrain or pavement. Suitable means have been desired to modify the conventional shock strut so that it is smooth riding on normal terrain and yet can withstand the extreme shocks created when traveling over rough terrain.

SUMMARY OF THE INVENTION

The present invention includes a secondary chamber having a predetermined volume which is connected by means of an orifice to a primary chamber which is normally the air spring portion of a shock strut. The area of the secondary chamber is such that even though additional fluid is added to the shock strut, the static spring rate of the air spring at small deflections is less than that of the strut when it only has a primary chamber. The connection between the secondary chamber and the primary chamber is preferably above the normal fluid level so that the fluid level can cover the connection during extreme deflections of the shock strut. This has the effect of greatly reducing flow to the secondary chamber so that thereafter the air spring static spring rate at a given deflection is primarily dependent upon the remaining volume in the primary chamber.

There is, of course, flow of gas and/or fluid through the orifice no matter how fast or slow the defleciton occurs. The orifice acts on the gas to partially switch off the secondary chamber only at high deflection rates when high deflection pressures are present across the orifice. This has the effect of increasing the effective static air spring rate at a given deflection during rapid but not extreme deflections of the strut.

There is very little dampening effect from the gas going through the orifice. However, the fluid when passing through the orifice does provide substantial dampening because turbulence in the fluid caused by the orifice heats the fluid and thus absorbs energy from the strut.

The secondary chamber with its attendant orifice connection to the primary chamber can be incorporated in many ways, three of which are discussed in this specification. It is shown incorporated into the triple clamp normally employed to restrain such shock absorbers to a motorcycle, added by means of a modified top seal bolt, or constructed from relatively economical materials and merely clamped to a hole drilled in an otherwise conventional shock strut.

Thus the present invention solves all of the problems discussed heretofore by providing a shock strut which can be relatively soft for the normal deflections found in highway driving, which automatically becomes firmer when subjected to high deflection velocities but not extreme deflections and yet provides protection against the strut being bottomed by greatly increasing the spring rate when subjected to a large deflection.

It is therefore a principal object of the present invention to provide a velocity responsive shock strut which has velocity and deflection sensitive air spring means.

Another object is to provide means to modify a conventional shock strut which improve the ride of a motorcycle whether it be used on the highway or off the road.

Another object is to provide relatively economical means for improving the shock absorbing characteristics of a conventional air-fluid shock strut.

Another object is to provide means for easily and conveniently changing the shock absorbing characteristics of a conventional shock strut.

These and other objects and advantages of the present invention will become apparent after considering the following detailed specification which covers preferred embodiments thereof in conjunction with the accompanying drawing.

BRIEF DESCRIPTION OF THE DRAWING

FIG. 1 is a broken, partial cross-sectional view of a relatively conventional shock strut such as are used on motorcycles with the present invention installed thereon;

FIG. 2 is a nondimensional graph of spring rate versus deflection for the various components of the shock strut shown in FIG. 1;

FIG. 3 is a partially cutaway side elevational view of a modified embodiment of the present invention which could be used in conjunction with the shock strut of FIG. 1; and FIG. 4 is a partially cutaway side elevational view of another modified embodiment of the present invention shown mounted to a portion of a shock strut similar to that shown in FIG. 1 and constructed for economy.

DETAILED DESCRIPTION OF THE SHOWN EMBODIMENTS

Referring to the drawing more particularly by reference numbers, number 10 in FIG. 1 refers to a telescoping shock strut such as are conventionally used on motorcycles. The strut 10 includes a pair of telescoping cylindrical members with the upper member 12 having a smooth cylindrical outer surface 14 which mates with a smooth cylindrical inner surface 16 of the lower member 18. The upper end 20 of the upper member 12 is sealed by suitable means such as an O-ring 22 and a cap bolt 24. A suitable sliding seal 26 is provided adjacent the upper end 28 of the lower member 18. The lower end 30 of the member 18 is sealed by another O-ring 32 which is held in position by a piston rod 34 retained against the bottom surface 36 by means of a bolt 38. The two O-rings 22 and 32 and the seal 26 assure that the inner volume of the two members 12 and 18 is sealed from the outside atmosphere when the strut 10 is in its conventional configuration.

This inner volume is normally partially filled with hydraulic fluid whose surface is numbered 40. The remaining volume thereabove is normally filled with air which is at atmospheric pressure when the strut is completely extended although other gases such as pure nitrogen and elevated pressures have been used.

In use, the shock strut 10 has forces applied thereto between a lower axle engaging cylindrical surface 42 and a triple clamp 44, only half of which is shown. Road shocks are transmitted into the lower member 18 which attempts to move upwardly. This upward movement is immediately resisted by a preloaded spring 46 which is held in preload by any suitable means such as through engagement with a suitable abutment surface 48 on a piston 50 attached to the end 52 of the piston rod 34 and a similar abutment surface 54 formed in the cap bolt 24. When pressurized air is used, the spring 46 can be eliminated.

The upper member 12 has an inner cylindrical surface 56 against which the piston 50 is dynamically sealed. Therefore, relative movement between the upper member 12 and the lower member 18 causes the piston 50 to move with respect to the upper member 12 so that the hydraulic fluid is pushed through an orifice 58 formed between the piston rod 34 and an inwardly facing flange 60 connected to form the lower end 62 of the upper member 12. The fluid absorbs energy in the form of heat when being forced through the orifice 58 and therefore acts as dampener means for the shock strut 10.

As the lower member 18 is deflected upwardly with respect to the upper member 12, the volume of gas 64 above the fluid surface 40 begins to compress which also resists further upper movement of the lower member 18. The compressed gas volume 64 acts like any conventional air spring whose spring rate increases with compression. The characteristic spring rate versus deflection for this type of air spring is shown as line 66 in FIG. 2, the characteristic rate of the spring 46 being shown by line 68. The reltive positioning of the lines 66 and 68 are merely for illustrative purposes. Their actual relative rates vary greatly with strut design.

When an extreme shock which exceeds the shock absorbing capability of the strut is transmitted thereto, a frustroconical portion 70 of the piston rod 34 begins to restrict the flow of fluid through the orifice 58 which has a suitable conically shaped end portion 72 so that gradually the shock strut 10 goes into hydraulic lock and metal to metal contact is never obtained. This characteristic is shown in FIG. 2 by line 74 which shows that the effective spring rate goes up abruptly once a predetermined deflection has been reached.

When strut deflecting forces are removed therefrom, the member 18 rebounds and extends away from the member 12 due to the forces created by the spring 46 and the air spring of volume 64. This causes the piston 50 to compress the fluid in the volume 76 and force it back through the orifice 58. Generally it is desirable that less dampening be incorporated in the rebounding of the shock than there was in the retraction thereof. Therefore means such as the foot valve 78 can be employed to open additional passageways 80 through the flange 60. The foot valve shown includes a ring 82 which is retained adjacent the lower end 62 of the flange 60 in the position to cover and uncover the passageways 80. Fingers 84 attached to the flange 60 retain the ring 82 in the proper area. As the shock strut 10 nears its full extension, a second frustroconical section 86 tends to close up a matching conical section 88 of the orifice 58 to provide additional dampening and prevent abrupt metal to metal contact as the shock becomes fully extended. Line 87 in FIG. 2 shows this characteristic.

As aforesaid the problem with such struts 10 is that they must be extremely stiff if the strut is to be used for off the road purposes, whereas smooth and confortable riding on paved surfaces requires a strut 10 with a relatively low spring rate so that the ride is soft. The result is that some motorcycles are equipped with struts much too soft for off the road use or much too hard for on road use whereas others are equipped with compromise shock struts which do not work well for either.

The present invention 89 solves this compromise problem by automatically sensing when a soft or hard shock strut is required and by adapting the shock strut system to such conditions. The present invention 89 is shown in FIG. 1 as including a secondary chamber 90 which is connected by a passageway 92 passing through a portion of the triple clamp 44 and a removable orifice or jet 94 to communicate with the volume 64 forming the primary air spring chamber 96 of the strut 10. The communication through the member 12 is usually accomplished by drilling a hole 98 through the side wall thereof at a level which is above the fluid surface 40 when the strut 10 is in its extended position. At small deflection velocities the chambers 90 and 96 operate in unison so that the air spring rate which results is much less than it ordinarily would be even when the fluid level 40 is heightened by adding additional fluid to the strut 10. This rate is shown by the portion of line 100 of FIG. 2 below point 102 thereof. Deflections below point 102 are those normally encountered when riding a motorcycle on relatively smooth terrain and it is easily seen in FIG. 2 how a lower spring rate is present thus allowing a smoother ride. There are instances, however, when relatively high velocity deflections of the strut 10 are cuased by the terrain, where no single deflection is large enough to deflect the strut 10 into the region beyond point 102 and where it is desired to increase the stiffness thereof. This is accomplished at high velocity deflections by the orifice 94 which restricts gas flow to partially remove the secondary chamber 90 from the effective volume of the air spring. This is shown by the portion of line 104 below the critical deflection point 102. It should be noted that line 104 is an extreme case and that the position of point 102 is a function of the quantity of fluid in the strut and of the level of the hole 98.

The last requirement of the present invention which is to absorb a large deflection without bottoming is accomplished since large deflectons raise the fluid level 40 above the hole 98 so that fluid rather than air is forced through the orifice 94. Since the viscosities of air and the chosen fluid are greatly different, this has the effect of switching the secondary chamber 90 almost completely off for reasonable velocity deflections. Therefore, the spring rate curve 100 jogs at 102 and thereafter goes up at a much steeper rate. As can be seen, the curve 100 crosses the curve 66 for the same shock strut 10. This will occur only if additional fluid has been added to this strut and the addition of fluid is contemplated when the invention is added to a strut 10. Of course the upper portion of curve 104 is the extreme where a deflection is so fast and hard that the chamber 90 is essentially at atmospheric pressure and therefore all of the compression has to be done in the primary chamber 96, obviously an extreme and unlikely case in normal use. It should be noted also that the spring rate curves 100 and 104 for the air spring do extend upwardly showning an increasing spring rate with deflection. The rate can be made to go so high that it is unlikely that the strut would ever bottom out or reach hydraulic lock.

It is also desirable that a certain additional amount of energy be absorbed when an extreme deflection of the strut 10 has been accomplished. The fluid which is forced through the orifice 94 performs this function by generating heat. This dampening and other functions of the present invention can be varied as desired through the use of orifices 94 of different sizes.

The chamber 90 is shown in FIG. 1 and includes a cap bolt plug 106 similar to the cap bolt which seals chamber 96. Various bolts like cap bolts 24 or ones 106 having cutouts such as the cutout 108 shown, also can be employed to vary the volume of the secondary chamber 90. By increasing the volume of the chamber 90, a softer ride may be obtained for small deflection rates and yet a more abrupt change in the spring rate characteristic is generated when the fluid level 40 passes the hole 98. Decreasing the orifice size can also do this and make the strut more velocity sensitive.

Also shown in FIG. 1 is a deflector plate 110 which can be welded within the chamber 90. The deflector plate 110 assures that once fluid has been forced within the chamber 90, that it remains in the lower portion 112 thereof so that the compressed gas thereabove expels it back through the orifice 94 and into the strut 10 during extension of the strut in readiness for the next compression thereof.

Although in FIG. 1 the present invention 89 is shown incorporated into the triple clamp 44, it can also be attached to the strut 10 in other ways such as those shown in FIGS. 3 and 4. In FIG. 3 the invention 89' is embodied in a modified cap bolt 24' which fits into the member 12 and performs the functions of the cap bolt 24. As can be seen, a downwardly extending hollow tube 112 has been welded to the lower surface 114 thereof and a hole 116 has been drilled completely through the cap bolt 24'. On the upper surface 118 of the cap bolt 24', a canister 120 has been welded to form a secondary chamber 90' which functions like the chamber 90 of FIG. 1. The end 122 of the tube 112 preferably extends down to the same level that the hole 98 would be drilled through the strut 10. The hole 116 through the bolt 24' and the inner passageway 124 of the hollow tube 112 form an orifice similar to orifice 94 which operates in exactly the same manner, that is as an air orifice until the fluid level 40 reaches the end 122 at which time it becomes a fluid orifice creating the spring rate characteristics shown by curves 110 and 104 in FIG. 2. The embodiment 89' shown in FIG. 3 is particularly useful when no permanent modification of the strut 10 is desired.

A more economical embodiment 89" is shown in FIG. 4. The embodiment 89" can be made from materials such as plastic which are easy to form and relatively economical. It includes a plastic canister 126 which forms the secondary chamber 90". The secondary chamber 90" communicates with the primary chamber inside the upper member 12" of the strut 10" by means of a drilled hole 98" similar in location and size to hole 98 shown in FIG. 1. The attachment is by means of a base member 128 which is constructed from a material which is softer than the member 12. The member 128 therefore has an inner semi-cylindrical surface 130 which engages the outer surface 14" of the strut 10" to thereby cover the hole 98". A passageway 132 which acts as an orifice connects the hole 98" to the chamber 90" and additional seal means can be provided such as a raised ring 134 molded into the surface 130 to assure that the chamber 90" is in sealed communication with the primary chamber within the strut 10". Suitable clamping means such as a conventional radiator hose clamp 136 can be employed to force the raised ring 134 into the side surface 14" and maintain the sealing contact thereof. Of course, the embodiment 89" shown in FIG. 4 operates in the exactly same manner as emobdiments 89 and 89'.

Thus there has been shown and descirbed novel means for modifying and improving shock absorbing struts to give them deflection velocity sensitivity and a dual spring rate which fulfill all of the objects and advantages sought therefor. Many changes, modification, variations and other uses and applications of the subject invention will however, become apparent to those skilled in the art after considering this specification and the accompanying drawing. All such changes, modification, alterations and other uses and applications which do not depart from the spirit and scope of the invention are deemed to be covered by the invention which is limited only by the claims which follow.

What is claimed is:

1. In a shock absorbing strut having first and second hollow telescoping portions, said first hollow telescoping portion having an interior, damping means including a fluid medium with a top surface and a primary chamber in said first hollow telescoping portion formed by said first hollow telescoping portion and the top surface of said fluid medium wherein a gaseous medium is retained and compressed by upward movement of said top surface caused by retraction movement of said second hollow telescoping portion with respect to the first, the improvement comprising:

a secondary chamber defining a predetermined volume; and orifice means located between said secondary chamber and the interior of said first hollow telescoping portion, said orifice means being positioned with respect to said fluid medium top surface to allow communication of said gaseous medium into and out of said secondary chamber when said strut is in a generally extended condition and to allow communication of the fluid medium into said secondary chamber when said strut is in a generally retracted condition.

2. The strut defined in claim 1 wherein said orifice means include:

a conduit between the interior of said first hollow telescoping member and said secondary chamber, said conduit including an orifice.

3. The strut defined in claim 2 wherein said orifice is formed by an orifice fitting threadably engaged in said conduit.

4. The strut defined in claim 1 including a motorcycle triple clamp which has upper and lower clamp members, wherein said first telescoping member is retained by said triple clamp which restrains said strut at at least upper and lower locations therealong by means of said upper and lower clamp members, said orifice means including:
   a passageway through said first telescoping member at the location of said lower clamp member;
   an orifice in said triple clamp in communication with said passageway;
   a seal about said passageway and orifice between said first telescoping member and said lower clamp member; and
   a conduit connecting said orifice to said secondary chamber.

5. The strut defined in claim 4 including a baffle in said secondary chamber adjacent said conduit.

6. The strut defined in claim 4 wherein said secondary chamber is formed by a hollow body having an open top with threads thereabout and a plug member adapted to threadably and sealably engage said hollow body to define a volume.

7. The strut defined in claim 6 wherein said plug member is predeterminately hollow so that the volume of said secondary chamber can be controlled.

8. The strut defined in claim 1 including:
   a hollow canister;
   a base member sealably connected to said hollow canister to form said secondary chamber; and
   a clamp for retaining said base against said first hollow telescoping member, said base including said orifice means.

9. The strut defined in claim 8 wherein said base member includes a semi-cylindrical surface for mating with said first hollow telescoping member, and a conduit from said semi-cylindrical surface to said secondary chamber, said first hollow telescoping member having a passageway from the interior thereof to the exterior thereof over which said base member is clamped with said conduit and said passageway in communication.

10. The strut defined in claim 9 wherein said base member is constructed from a material which is softer than said first hollow telescoping member, said semi-cylindrical surface having an outwardly extending bead formed about said conduit which form a seal between said base member and said first hollow telescoping member when said base member is clamped thereto.

11. The strut defined in claim 1 wherein said first telescoping member has an open, threaded cylindrical top and a plug member which threadably and sealably engages said top, said plug member including a hollow canister sealably connected thereto to form said secondary chamber, and a conduit which extends downwardly from said secondary chamber to a predetermined level which is above said fluid level when said strut is extended to form said orifice means.

12. The strut defined in claim 11 wherein said canister is formed by a hollow member having a closed end and an open end which is welded to a plug bolt top to define a predetermined volume, said plug bolt defining an opening longitudinally therethrough and having a hollow tube welded thereto to form said conduit and to extend said opening to said predetermined level.

13. Means for modifying the reaction of a shock strut containing fluid as a damping agent and gas as a spring agent to retraction and extension forces, said means including:
   a container defining a predetermined volume;
   orifice means connected in communication with said container and adapted to communicate with the gas and fluid in said strut;
   means to retain said orifice means in sealed communication with said strut; and
   a strut plug bolt having a top and a bottom wherein said container is sealably attached to the top of said strut plug bolt, said orifice means including a hollow tube attached to the bottom of said strut plug bolt, and the plug bolt having an opening defined therethrough communicating said tube and said container.

14. The means defined in claim 13 including a baffle in said container adjacent said plug bolt opening.

15. A device for modifying the reaction of a shock strut to retraction and extension forces, the shock strut being of the kind containing fluid as a damping agent and gas as a spring agent, wherein the fluid and gas have an interface which moves to different levels in the strut in response to the extension and retraction forces applied to the strut, said device including:
   a container defining a predetermined volume; and
   a base member connected to said container having a semi-cylindrical surface for engagement with the strut, a passageway from said predetermined volume to said semi-cylindrical surface of a size to form an orifice, a seal formed about said passageway on said semi-cylindrical surface, and means to clamp said base member to the strut and to maintain a sealed condition therebetween, whereby said passageway can be held in sealed communication with an opening in the strut so that the passage of the interface thereby modifies the reaction of the shock strut.

16. The means defined in claim 15 wherein said base is normally below said container and said passageway is slanted upwardly from said passageway opening to that fluid in said container tends to flow toward said strut.

* * * * *